(12) United States Patent
Zaacks et al.

(10) Patent No.: US 7,840,133 B2
(45) Date of Patent: Nov. 23, 2010

(54) METHOD AND SYSTEM FOR HYBRID PROTECTION IN OPTICAL NETWORKS

(75) Inventors: Mark Raymond Zaacks, Petach-Tikva (IL); Avner Libman, Holon (IL); Uri Mahlab, Or-Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 819 days.

(21) Appl. No.: 11/660,434

(22) PCT Filed: Aug. 4, 2005

(86) PCT No.: PCT/IL2005/000829

§ 371 (c)(1),
(2), (4) Date: Feb. 16, 2007

(87) PCT Pub. No.: WO2006/018831

PCT Pub. Date: Feb. 23, 2006

(65) Prior Publication Data

US 2007/0264008 A1    Nov. 15, 2007

(30) Foreign Application Priority Data

Aug. 16, 2004    (IL) .................. 163557

(51) Int. Cl.
| | |
|---|---|
| *G02F 1/00* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. ............... 398/4; 398/1; 398/2; 398/3; 398/5; 370/223; 370/354

(58) Field of Classification Search .......... 398/4, 398/5
See application file for complete search history.

(56) References Cited

U.S. PATENT DOCUMENTS 5,457,556 A * 10/1995 Shiragaki .............. 398/50

(Continued)

FOREIGN PATENT DOCUMENTS

EP    0651528 A1    10/1995

OTHER PUBLICATIONS

Fang ["All Optical Four Fiber Bidirectional Line Switched Ring" Journal of Lightwave Technology, vol. 17 No. 8 Aug. 1999 ].*

(Continued)

*Primary Examiner*—Kenneth N Vanderpuye
*Assistant Examiner*—Oommen Jacob
(74) *Attorney, Agent, or Firm*—Browdy and Neimark, PLLC

(57) ABSTRACT

A technique for carrying out protection of data traffic in a multi-channel multi-section optical communications network by simultaneously using Optical Multiplexed Section (OMS) protection and Optical Channel (OCH) protection; the technique comprises selection of a working optical signal in an OCH protected optical channel, in case of a fault in a section of the network, by relying on an indication associated with OMS switching functionality that is required to overcome the mentioned fault.

15 Claims, 2 Drawing Sheets

U.S. PATENT DOCUMENTS

| | | | | |
|---|---|---|---|---|
| 5,884,017 | A * | 3/1999 | Fee | 714/4 |
| 6,134,036 | A * | 10/2000 | Andreozzi et al. | 398/1 |
| 6,317,426 | B1 | 11/2001 | Afanador et al. | |
| 6,504,963 | B1 * | 1/2003 | Fang et al. | 385/16 |
| 6,721,502 | B1 * | 4/2004 | Al-Salameh et al. | 398/3 |
| 7,515,532 | B2 * | 4/2009 | Casper et al. | 370/227 |
| 7,613,107 | B2 * | 11/2009 | Meguerditchian | 370/219 |
| 2002/0003639 | A1 * | 1/2002 | Arecco et al. | 359/119 |
| 2002/0186429 | A1 * | 12/2002 | Kaspit et al. | 359/110 |
| 2004/0141741 | A1 | 7/2004 | Palacharla et al. | |
| 2005/0031342 | A1 * | 2/2005 | Wu et al. | 398/32 |
| 2006/0067692 | A1 * | 3/2006 | Park et al. | 398/75 |

OTHER PUBLICATIONS

Cardwell ["Optical Networks Magazine" Jul. 2000 pp. 41-50] in view of Kaspit [US PUB No. 2002/0186429], and further in view of Arecco [US PUB No. 2002/0003639].*

Fang ["All Optical Four fiber Bidirectional Line Switched Ring" Journal of Lightwave Technology, vol. 17 No. 8 Aug. 1999].*

Cardwell ["Optical Networks Magazine" Jul. 2000 pp. 41-50] in view of Kaspit [US PUB No. 2002/0186429].*

Cardwell, R. et al; "WDM Architectures and Economics in Metropolitan Areas"; Optical Networks Magazine, SPIE, vol. 1, No. 3, Jul. 2000, pp. 41-50, XP000970223.

Fang, Xiaojun, et al; "All-Optical Four-Fiber Bidirectional Line-Switched Ring"; Journal of Lightwave Technology, vol. 17, No. 8, Aug. 1999; pp. 1302-1308, XP000908967.

Hamazumi, Y. et al; "Transmission Capacity of Optical Path Overhead Transfer Scheme Using Pilot Tone for Optical Path Network"; Journal of Lightwave Technology, IEEE Service Center, NY, vol. 15, No. 12, Dec. 1997, pp. 2197-2205, XP000727507.

Jian-Qing-Li et al; "Hybrid protection scheme of WDM ring network"; Proceedings OECC.IOOC 2001: Optoelectronics and Communications Conference Integrated Optics and Optical Fiber Communications; pp. 99-100; XP008055496, Sydney, Australia; 2001.

Rados, I., et al; "WDM in SDH network: introduction and interworking"; Photonics, Devices, and Systems II May 26-29, 2002, vol. 5036, No. 1, May 2003, pp. 280-286, XP008055519.

Ramos, A.J.; "Optical Network Architectures: Routing and Protection"; (CPRM-Marconi), http://www.eurescom.de/public-seminars/1998/ADM/Proceedings/Paper16.html.

Ye, Y. et al; "A Novel hybrid Protection Scheme for Survivable Wavelength Routed Optical Transport Networks", WDM and Photonic Networks, Proceedings of the European Conference on Networks and Optical Communications. NOC 2000. Amsterdam: IOS Press, NL, vol. Part 1 of 2, 2000, pp. 101-108, XP000993832.

ITU-T Standard Recommendations G. 798 (Sections 10.4.1, 12.1.1.1.).

ITU-T Standard Recommendations G. 841 (Sections 8.4).

* cited by examiner

METHOD AND SYSTEM FOR HYBRID PROTECTION IN OPTICAL NETWORKS

FIELD OF THE INVENTION

The invention relates to a technique for protection of data traffic in optical networks, including two types of traffic protection.

BACKGROUND OF THE INVENTION

Protection of traffic in optical networks can generally be classified under two types. The first type of protection, being a concept of line protection, is a so-called Optical Multiplex Section (OMS) protection used preferably in multi-channel multi-section ring networks. The ring network is formed by at least two concentric optical fiber rings capable of carrying data traffic in two opposite directions (clockwise and counterclockwise) between network elements NE in the ring. The two concentric fiber rings usually serve as a main route and a protection route for all optical channels of the network, although sometimes the main and the protection routes are arranged within the same fiber. The OMS protection ensures that in case of a fault of the traffic via a multiplex section on the main route (say, in a section between two specific network elements, that may include multiple optical channels), the protection route can be used to redirect the required data traffic from the main route, and thus to bring the traffic to its destination network element using the opposite direction. In this case, the redirected traffic might pass a longer distance than it would pass via the main route. The OMS protection is usually utilized in SDH and SONET optical networks, where it is respectively named MSSPRING (Multiplex Section Shared Protection Ring) and BLSR (Bi-directional Line Shared Protection).

The second known type of traffic protection in optical networks is a so-called OCH protection (Optical Channel protection). The OCH protection is intended for protecting a specific optical channel and by default can be implemented by providing simultaneous transmission of data traffic of that specific optical channel along both the main route and the protection route. In case of a fault in one of the routes, the other one will safely bring the traffic to its destination point.

Some attempts to combine the OCH and the OMS protection concepts are known in the art.

An article "VDM architectures and economics in Metropolitan areas" to R. H. Cardwell et al in the Optical Networks Magazine July 2000 describes a number of possible architectures combining both the OMS and the OCH protection principles, though it does not describe methods of how they are used together.

ITU-T standard recommendations G.798 (sections 10.4.1, 12.1.1.1) and G.841 (section 8.4) describe a possibility of implementing both of the above-mentioned protection concepts, and define so-called switch initiation criteria. These criteria are necessary when protection means are activated, for selecting a signal to be further used in the ring network. The switch initiation criteria are based on analyzing presence of various alarm indications in the signals to be compared in their binary electrical form. In addition, complex timing issues are considered for adequate selection criteria.

U.S. Pat. No. 6,317,426 describes a hybrid protection circuit for selectively protecting data streams according to one of the above-mentioned methods. Namely, the hybrid protection circuit can be electrically configured to one of various industry-standard protection techniques, including a bi-directional line-switched ring (BLSR) protection, a unidirectional path switched ring (UPSR) protection, and one-plus-one (1+1 or OCH) line protection. It should be emphasized that the solution of the U.S. Pat. No. 6,317,426 allows using different protection schemes separately.

Other methods exist in the prior art, for example a method described in an article "Optical. Network Architectures: Routing and Protection" by Antonio J. Ramos (CPRM-Marconi) http://www.eurescom.de/public-seminars/1998/) ADM/Proceeedings/Paper16.html. The article proposes using, in ring networks, OMS protection with OCH protection, wherein the latter is performed by electrical digital cross-connects. In case of a network fault, the traffic in the OCH level is rerouted electrically via existing connections by SDH equipment.

To the best of the Applicants' knowledge, the relevant prior art does not describe a method by which a hybrid OMS and OCH protection schemes could be combined in a fully optical manner, at any desired extent (for any number of optical channels as needed), without additional optical network components such as optical cross-connects, and without any form of wavelength conversion.

SUMMARY OF THE INVENTION

It is therefore the object of the present invention to propose a technology (a method and a system) for combined OMS and OCH protection of data traffic in telecommunication optical networks, which would allow simple selection of a correct and stable signal of the OCH protected channel in any situation in the network, and overcome a technical difficulty to distinguish signals passing via the main and the protection rings, and assist in solving a known problem of wavelength routing ambiguities (the matter relevant to the presently known combined OMS and OCH protection schemes).

The concept of the invention is creating such a technique of combined OMS protection and OCH protection of optical traffic in an optical communications network, which would utilize switching functions of OMS protection activated in case of a fault in a network section for selecting a suitable optical signal as a working signal to be finally used in an OCH protected optical channel.

The above object can be achieved by providing a method of carrying out protection of data traffic in a multi-channel multi-section optical communications network by simultaneously using Optical Multiplexed Section (OMS) protection and Optical Channel (OCH) protection, the method comprises a step of selecting an optical signal (as a working signal) in an OCH protected optical channel, in case of a fault in a section of said network, by relying on an indication associated with OMS switching functionality required to overcome said fault.

More particularly, said network is a multi-channel multi-section optical communications network comprising network elements connected in two ring-like optical fiber configurations (contours) wherein one of said contours is considered a main contour and the other is considered a protecting contour, and the method comprises:
  providing the OMS protection for at least one section of the network by ensuring, in case of a failure in said section, switching of the data traffic from one of said contours to another of said contours at each of two ends of said section;
  providing the OCH protection for at least one optical channel in the network, by transmitting data related to said optical channel from one of said network elements being a source point of said channel to another of said network elements being a destination point of said channel by means of two optical signals carrying identical information, wherein one of said optical signals is transmitted via the main contour and another of said optical signals is transmitted via the protect contour;

rejecting such one of the two optical signals of said OCH protected channel, that has undergone switching from one of said contours to another of said contours at least at one end of said section, to allow using at the destination point only the other one of said optical signals that has not undergone said switching, as the working signal.

The concept of rejecting the optical signal of OCH protected channel if switched by means of OMS protection to a bypass route (and thus being either unsuitable or less preferable) differs from any other method described in the prior art. The method is advantageous in that it simplifies the measures of preventing ambiguities in routing optical channels in optical networks. It can practically be performed in a number of ways, some of which will be described and illustrated later on.

It should be first clarified what are the features of the OMS protection and OCH protection which allow using them together in a cooperative way, according to the above-defined invention.

The step of providing OMS protection to at least one section of the network should be understood as enabling circulation of the data traffic in said network in case of a fault in said section. It is conventionally performed in two stages: 1) at one end of the faulty section, redirecting (switching) traffic of all optical channels, which are to pass via the main contour of the section, to the protect contour of the network in order to bring the data traffic up to another end of the faulty section using the opposite direction, 2) redirecting the traffic from the protect contour back to the main route. The OMS protection of a particular network section is usually implemented by two switching means situated at the ends of the section, each enabling switching of the data traffic from one of said contours to another of said contours (i.e., to the alternative contour).

Therefore, one preferred version of rejecting the "switched" signal is by rejecting the optical signal that carries any indication (physical trace, imprint, artifact) of having been switched by said (OMS) switching means.

Detecting the fact of switching the signal by the switching means can be performed, for example, by detecting a momentary loss inherently created in the signal while switching it in the switching means.

Another example could be by detecting ally indication in the form of a signaling artifact upon intentionally adding it to the signal that has been switched in the switching means. Such a signaling artifact can be an intentionally created/amplified momentary loss, a predetermined modulation tone, imprinting a certain known signature, etc.

As has been noted above, the step of providing the OCH protection at a particular optical channel in the network should be understood as transmitting the data of that channel from its source point to its destination point via both the main and the protect contours of the network. Usually, it is provided either by splitting the traffic data of the particular optical channel, or by using two transmitters of the particular traffic data, thereby obtaining two identical sources of the traffic data. For example, they can be located at the network element being the source point of the channel. In the present invention, providing the OCH protection preferably comprises providing OADM (Optical Add Drop Multiplexer) at the source point and at the destination point of the OCH protected channel, both on the main route and on the protect route of the source point and the destination point.

The step of rejecting can be based on a different principle, for example on the fact that a redirected optical signal just added to the traffic may be dropped at the same node if its wavelength remains the same (a so-called self-feeding). Alternatively, or in addition to the described options, the rejecting step may comprise preliminarily applying said indication in the form of an additional pilot tone for transmitting data from the source point of the OCH protected channel, and further detecting at the destination point of said OCH protected channel an optical signal not comprising said additional pilot tone. Such a detected signal is further rejected, in order to select (as the working signal) the optical signal having said additional pilot tone.

The OCH protection can be arranged for a unidirectional channel, but usually it is provided in both directions (for a bi-directional channel), so that each of the source point and the destination point serves as a source/destination point.

The OCH protection of one bi-directional channel can be performed using either different wavelengths, or one and the same optical carrier wavelength at its two source/destination points. When no faults exist in the network, two optical signals launched due to the OCH protection arrive to a source/destination point of the channel and by default, the optical signal from the main contour is selected for further use (considered to be the working signal).

If any section of the network is faulty, and if different carrier wavelengths are used for OCH protection in a bi-directional optical channel, each of the source/destination points receive two optical signals at a wavelength different from the wavelength at which it transmits data to the other source/destination point. At each of the source/destination points, the undesired optical signal can be rejected upon detecting the fact of switching thereof, and the "desired" receiver can be then electrically selected as an output.

When one and the same carrier wavelength is used for OCH protection of a bi-directional channel, one of the optical signals just added to the main and the protect contours at a source/destination point node will immediately be rejected by a suitable OADM when the signal passes the same node after switching the contour. In other words, the above-mentioned problem of self-feeding is not prevented, but intentionally created and used here for rejecting a non-desired switched optical signal. The same situation happens at the second source/destination point. Each of the source/destination points thus drop, at one and the same carrier wavelength, one irrelevant (self-fed) optical signal and one relevant optical signal arriving from the second source/destination point. To select the signal required for further use at a particular source/destination point, one should apply some type of detection.

The detection can be performed as described above, i.e. by detecting a characteristic imprint or an artificial signaling artifact generated by an optical switch or by any device in association with the optical switch responsible for the OMS protection mechanism.

However, the detection can be performed by another manner, for example by using two different pilot tones, in addition to a carrier wavelength, for transmitting data from two respective source/destination points.

Selection of the required (working) optical signal at a particular source/destination point will be performed by: rejecting the signal having the pilot tone which is used for transmitting data of the OCH protected channel from that same particular source/destination point, thereby selecting the signal having the second pilot tone (which is used for transmitting data from the other source/destination point of the OCH protected bi-directional channel).

By selecting the signal that has not overcome switching to an alternative route, the network avoids reaching undesirable states such as selecting a channel that originates from a wrong location. The proposed solution inherently assures that all optical channel designations reach the proper (target) receiving end. Signals that, due to a fault in the network, erroneously arrive to an OCH slot from wrong locations—will be rejected at the stage of the OCH channel selection.

As has been noticed before, the OCH protection, which is usually expensive when applied to each optical channel in the network, can be selectively provided only to important optical channels, by using the proposed invention.

The combination of the OMS and OCH protection allows protecting some specific (for example, highly important) optical channels more reliably. At the same time, presence of the OCH protection does not affect functions of the OMS protection with respect to other (non OCH protected) optical channels of the network, and vice versa.

It should be noted that in OMS protected networks, OADMs (or other optical filtering means) are customarily located only on the main contour at nodes (network elements) where traffic data is to be added to/dropped from the optical network. According to the present invention, OADMs (or the like) are located also on the protect contour, but only at the nodes being either a source node or a destination node of the OCH protected optical channels. Owing to that, the present invention proposes a low cost and scalable solution to protecting optical networks in a manner such that the network operator may select the level of protection desired for a specific channel. Namely, for low cost protection against OMS failures such as fiber cuts, OMS protection could suffice; however, for high priority signals/channels which secure protection is mandatory, individual OCH protection is offered to be used simultaneously with the OMS protection. The cost function for protection of such a multi-channel network is linear; as opposed to other protection schemes where the addition of one OCH channel requires a large amount of equipment to set-up, in the described solution the user pays an incremental amount for each OCH channel he/she wishes to add to the system.

According to another aspect of the invention, there is also provided a system capable of simultaneously performing OMS protection and OCH protection of optical traffic in a multi-channel multi-section optical communications network, the system being operative to utilize switching functions of OMS protection for simplifying implementation of the OCH protection functions, namely for simplifying selection of a suitable and stable optical signal of an OCH protected optical channel in case of a fault in at least one of the sections.

In other words, the object can be achieved by a system capable of simultaneously carrying out Optical Multiplex Section (OMS) protection and Optical Channel (OCH) protection of optical traffic in a multi-channel multi-section optical communications network, the system being operative to select an optical signal in an OCH protected optical channel in case of a fault in a section of said network by relying on an indication associated with OMS switching functionality required to overcome said fault.

More particularly, the network comprises network elements connected in at least two ring-like optical fiber configurations (contours) wherein one of said contours is considered a main contour and the other is considered a protect contour, and the system comprises:

an OMS protection arrangement for at least one section of said network, including switching means at both ends of said section, an OCH protection arrangement for at least one optical channel formed in said network between a source point and a destination point, the OCH protection arrangement including OADM (or other optical filtering means) in a protect contour at the destination point of said optical channel, means for rejecting use at the destination point of an optical signal related to the OCH protected optical channel, that has been switched at least once from one of said contours of the network to another by the OMS protection mechanism.

The rejecting means may be situated at the destination point of said optical channel and comprise a detector of said indication (an imprint or an artifact) associated with the switching of said optical signal in the switching means and a comparator or selector for further selecting an optical signal not comprising said indication. The rejecting means may further comprise an amplifier or a generator of said indication, associated with (for example, situated within or nearby) any one of the OMS switches in the network.

Alternatively, or in addition, the rejecting means may comprise a modulator at the source point of the OCH protected optical channel for applying a specific pilot tone to data transmitted via said channel, and a tone detector (selector, filter) at the destination point of said optical channel for further detecting and rejecting any optical signal having a different pilot tone. In this embodiment, the additional pilot tone serves said the above-mentioned indication, the selection of the suitable signal is performed based on the presence of such an indication while rejection of unsuitable signal is carried out in response to the absence of the indication.

The system is preferably adapted to bi-directional OCH protected optical channels. According to one embodiment of the system, one and the same carrier wavelength is used for transmitting data in said OCH protected optical channel in both said directions.

The proposed method and the system can be used both for ring-like optical networks and for mesh optical networks.

Further details of the invention will become more clear as the description proceeds.

BRIEF DESCRIPTION OF THE DRAWINGS

The present invention will be further described and illustrated with reference to the following non-limiting drawings, in which.

DETAILED DESCRIPTION OF THE PREFERRED EMBODIMENT

Figure 1:
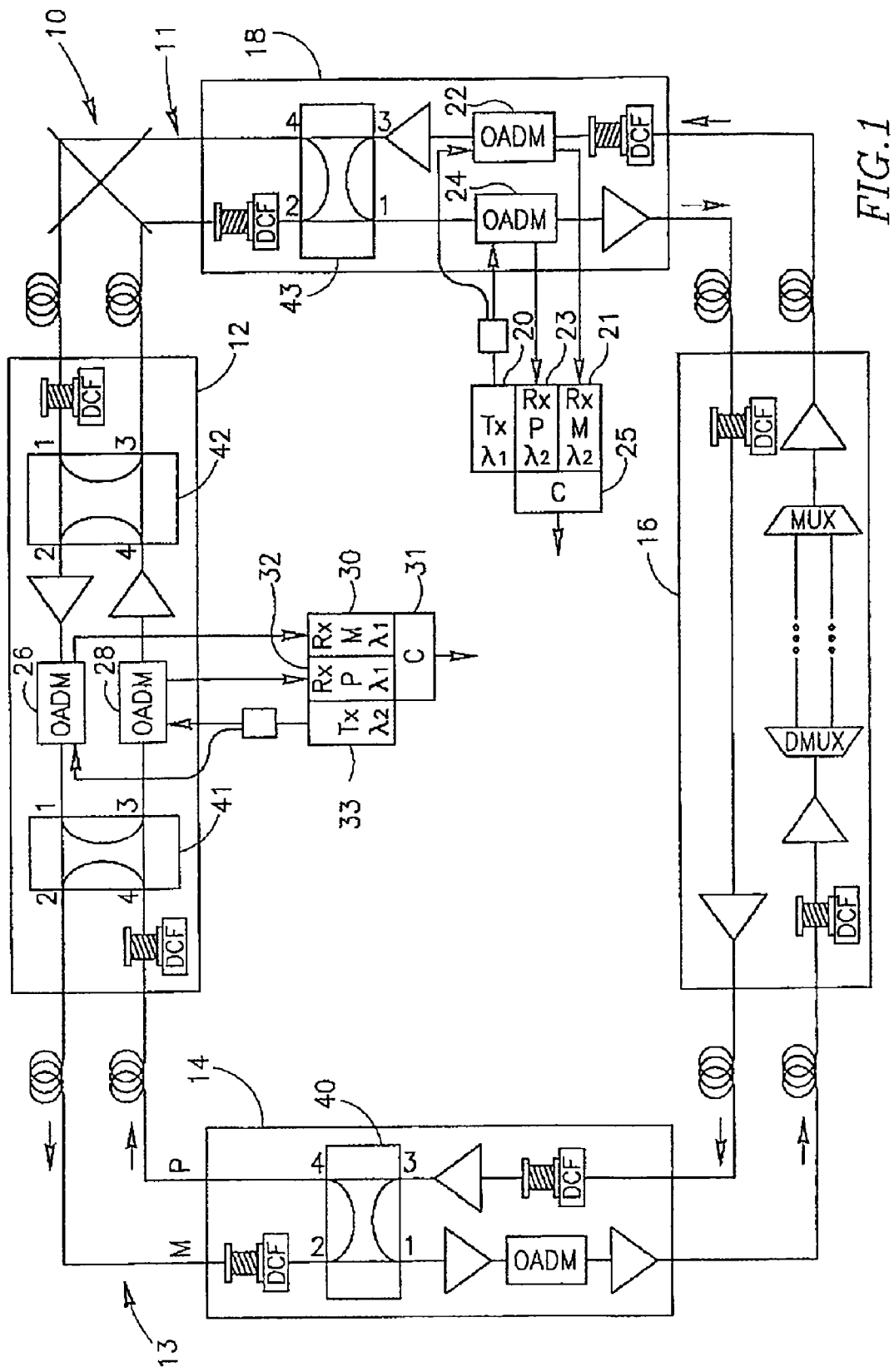
FIG. 1 illustrates one example of an optical network implementing both the OMS and OCH protection systems of data traffic.

FIG. 1 illustrates an exemplary optical network, in this particular case a ring-like network 10. It comprises four network nodes 12, 14, 16 and 18 with optical amplifiers depicted as triangles, and four links formed between the nodes. Each of the links is bi-directional and comprises two segments of optical fibers for transmitting data traffic in two opposite directions. Therefore, the ring network comprises one ring formed by optical fibers transmitting data in the counter-clockwise direction (let it be the outer ring called main ring and marked M) and one protect (protection) ring transmitting traffic between the nodes in the clockwise direction (the inner ring called protection ring and marked P). It should be noted that the rings' functions may change dynamically: in the course of operation the main ring may become a protection ring and vice versa. Two sections in the ring-like network (section 11 between nodes 12 and 18, and section 13 between nodes 12 and 14) are OMS protected, say by means of a OMSPRing system (optical multiplexed section protected ring). Alternatively, the OMS protection may be implemented by BLSR protection, or the like. Optionally, the other two sections of the network 10 can also be protected in a similar way by OMS protection but, without loss of generality, are shown as unprotected in this example. To this end, each protected section is provided with a 2×2 switch (switches 40, 41, 42, 43 are shown), each allowing redirection of traffic from the main ring to the protection ring and vise versa if a fault is detected in some section of the ring and a faulty section is to be isolated. Every switch has for I/O ports 1, 2, 3, 4 and operates as follows. When the network is in its normal regime, the traffic is transmitted through each specific switch directly, along the contour to which the traffic was launched (i.e., between ports 1 and 2, and between ports 3 and 4). The internal connections marked in the switches by curved lines can be established in case of a fault in the ring, and only in those switches surrounding the faulty section of the ring. If a fault occurs in any OMS protected section of the network (say, in section 11, the fault is marked with a cross), each switch adjoining the faulty section redirects the OMS protected multi-channel signals so as to slip the faulty section by using an internal loop in the switch (namely, the switches 42 and 43 now form internal connections between ports 1 and 3, and between ports 2 and 4). The multi-channel traffic thus passes through the protection ring, reaches the second looped switch adjoining the faulty section, where the traffic is redirected again to the main ring and finally arrives to its destination point(s).

The network 10 is provided with so-called DCF units (Dispersion Compensating Fiber units). DCF units are inserted to compensate effects of optical chromatic dispersion accumulated in the transmission fibers.

The example further shows that in addition to OMS protection intended for traffic of all optical channels using the protected ring sections, one specific optical channel (added at node 18) is individually protected by an OCH system. To this end, transmitter 20 of this channel is connected both to OADM 22 of the main ring, and to OADM 24 which should be placed for this purpose on the protection ring at node 18. The data traffic of that individually protected channel may originate from one and the same transmitter 20 and be simply split into two portions to be added to the two contours, or it may be transmitted from two separate transmitters to ensure the equipment protection. The data traffic of the discussed channel is therefore transmitted from the source node 18 (say, using wavelength $\lambda 1$) via both of the rings to the destination point, being in this example node 12, where this channel is dropped by internal OADMs 26, 28 of the node 12, at the wavelength $\lambda 1$.

In this example, both signals comprising data traffic of the individually OCH protected channel from node 18 are received at receivers 30 and 32 and are continuously compared (a comparator scheme is marked 31). The comparator can be placed before or after the receivers. If neither of the signals is found to be switched by the switching mechanism of OMSSpring (i.e., no faults were detected so no redirection was provided), the system selects the signal arriving from the main ring—more exactly, from the ring which is currently considered to be main.

But if, for example, link 11 has been, switches 42 and 43 are switched to redirect the OMS signal (the multi-channel signal) from the main ring to the protection ring. In this case, all OMS protected channels that are not OCH protected, are transparently redirected through the protection ring to D-tour the faulty link and return to the main ring. In addition to OMS protection, the signal originating from node 18 is also OCH protected. Since the signal portion carried on the protection fiber is not affected by the fault on link 11, this signal is unchanged and the receiver 32 continues to be accepting the transmission data. Contrary to that, receiver 30, which receives the redirected signal from the main ring via OADM 26, must recognize it as the OMS-switched signal which is to be rejected according to the invention (say, the receiver 32 can be switched by the comparator 31 to accept the transmitted data).

In general, the switched signal can acquire any characteristic "imprint" of the switches 42 and 43 currently in the OMS protection mode, that affects all channels passing through the switches. The imprint can then be detected by the comparator 31. The switched signal can be determined, for example, by detecting a momentary loss, or a particular modulation applied in the signal upon passing through switch 43 and/or 42.

If any of the signals comprises the mentioned imprint/artifact, the alternative signal is selected for further use, since it is considered a more reliable signal.

If the discussed OCH protected channel is bi-directional, a symmetric equipment set can be provided to perform the similar operations when data traffic is transmitted from node 12 to node 18. Namely, transmitter 33 may transmit the data traffic to the two rings via the OADMs 26 and 28, and two receivers 21 and 23 may receive and compare the two signals at the node 18 from the two OADMs 22 and 24. The transmitter 33 may transmit the data at a different wavelength (say, $\lambda 2$), and the OADMs 22 and 24 (and then receivers 21 and 23) will drop the signals at $\lambda 2$.

However, and preferably, the transmitter 33 may use the same wavelength $\lambda 1$ as the transmitter 20, and this situation (being problematic for many known combined protection schemes) can successfully be used in the frame of the proposed concept.

The proposed invention enables combining the two types of protection without a need in wavelength conversion. Continuing the previous example where link 11 was faulty, and for a specific case where the channel transmitted on the protect ring is of the same wavelength as the channel transmitted on the main ring, the transmitter 33 transmits at the same wavelength as the transmitter 20. In this case the OADM 26 gets its looped signal directly from OADM 28 through switch 42, so the signal being dropped to receiver 30 is actually the same signal as that being generated by transmitter 33. This ambiguity involving proper recognition of signals on the main and protect rings is not harmful since it is solved by the fact that receiver 30 will any way detect a characteristic imprint or a predetermined artifact in the dropped signal, while receiver 32 detects a "clean" signal. As a result, the correct signal will be selected as a working signal for further use at the node 12. The similar situation will take place at node 18. Owing to the original method of selecting only signals without OMS switching traces, the task of proper recognition of OCH protected signals and the problem of ambiguous routing in combined OMS and OCH protected systems are resolved.

Figure 2:
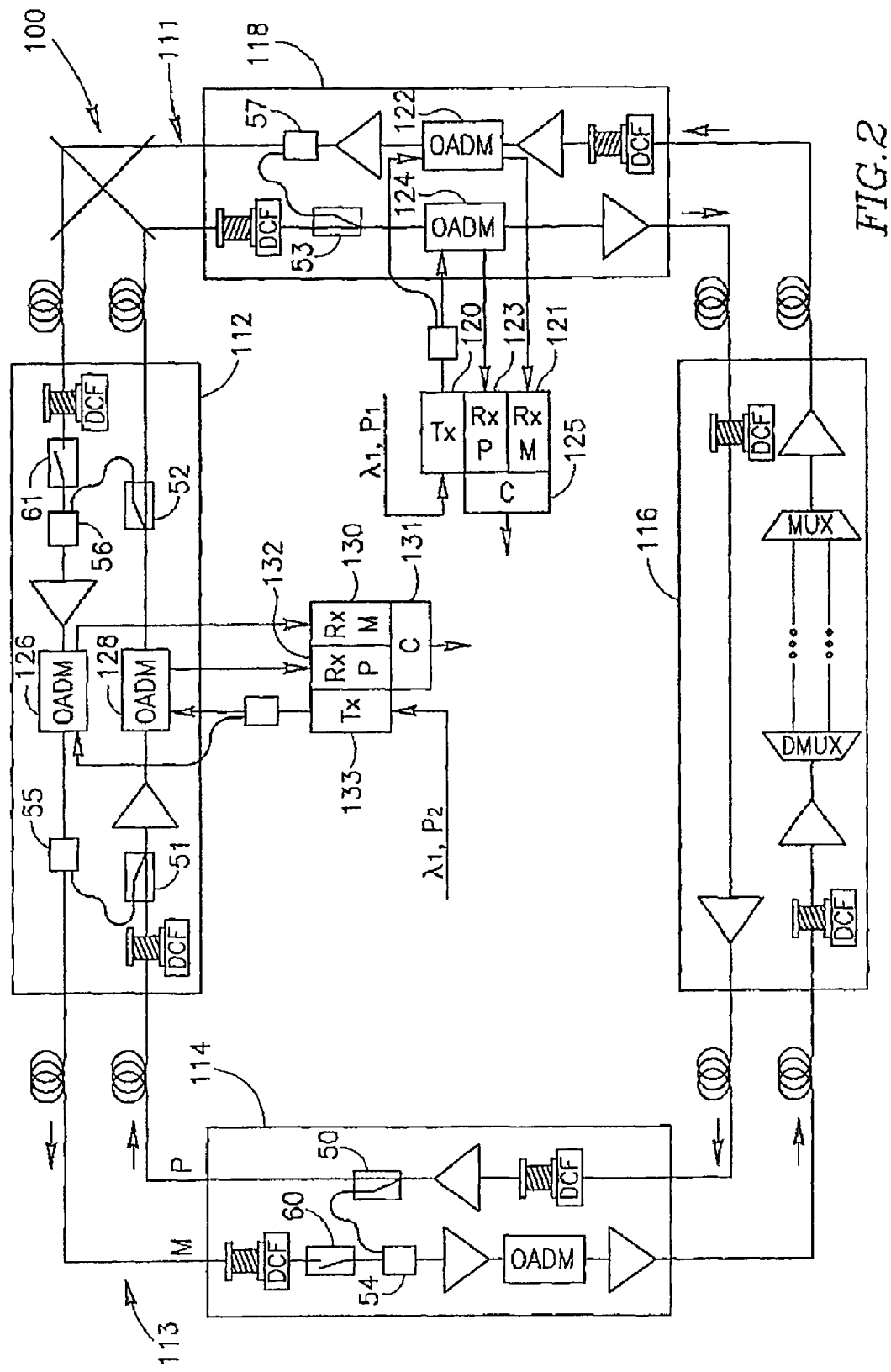
FIG. 2 illustrates another example of an optical network implementing the OMS and OCH data protection.

FIG. 2 illustrates an example, where a network 100 comprises modified nodes 112, 114, 116 and 118, and where switches 40, 41, 42 and 43 (see FIG. 1) are replaced, for example, with 1×2 switches 50, 51, 52 and 53 respectively cooperating with 1×1 optical switches 60 and 61 integrated with optical power splitters 54, 55, 56 and 57. The OMS protection shown in FIG. 2 serves the links 111 and 113, but is slightly different than in FIG. 1. The exemplary implementation shown in FIG. 2 is arranged in such a way that by using less complex equipment it allows avoiding a single point of failure (which in FIG. 1 is introduced by using switches 40, 41, 42 and 43). Splitters, being passive devices, are less subjected to failure; also, separation of components belonging to the main and the protect rings reduces chances of disabling both of the rings simultaneously. One skilled in the art may see that the configuration of FIG. 2 is able to provide similar results configuration of FIG. 1 using the 2×2 switches.

Optionally, the couplers in FIG. 2 can be modified. For example, instead of being wide band couplers (coupling all the OMS protected channels), they may be replaced with narrowband filters that transfer only selected channels for OMS protection. Such a scheme may be useful if it is required to protect only particular channels by the OMS protection scheme.

The system of OCH protection is similar to that in FIG. 1. It can be arranged for one or more individual optical channels, either for one or for both directions of transmission. The drawing shows an arrangement for OCH protection of a bidirectional optical channel added to the network at node 118.

Let us suppose that data is transmitted via the OCH protected channel in both directions at the same wavelength λ1. Let us also suppose that the network 100 is not provided with detectors of any previously discussed OMS switch imprint in the optical signals that have overcome redirection via the OMS switching means (in this case, by the splitters and couplers). In order to recognize the optical signals and select proper ones for further use in the OCH protected channels, pilot tones P1 and P2 are respectively added to the transmitted signals (P1 at transmitter 120 and P2 at transmitter 133). In case of failure ill section 111, the optical signal at λ1 modulated by P1 added to OADM 122 of the main ring will be redirected to OADM 124 of the protect ring and will be immediately dropped (as being carried at λ1) to receiver 123. Since the receiver 123 is adapted to receive an OCH protected signal from node 112 at the wavelength Al modulated with pilot tone P2, the signal will be rejected. Receiver 121 will receive from OADM 122 a signal that was added to OADM 126 by the transmitter 133 (λ1 and P2), which did not change its route and is inherently stable. Comparator 125 in this case may comprise a P2 filter, which will reject the wrong signal transmitted from this same node 118 and select for further use (as a working signal) the correct stable signal from node 112.

It will be appreciated by a person skilled in the art that the present invention is not limited by what has thus far been described with respect to specific embodiments. Other embodiments of equipment and configurations of networks could be proposed for implementing the concept of the invention. Rather, the present invention is limited only by the claims which follow. When used in the following claims, the terms "comprises", "comprising", "includes", "including" or the like mean "including but not limited to".

The invention claimed is:

1. A method of carrying out protection of data traffic in a multi-channel multi-section ring-like optical communications network by simultaneously using Optical Multiplexed Section (OMS) protection and Optical Channel (OCH) protection, the method comprising:
    providing the OMS protection for at least one section of the network by ensuring, in case of a failure in said section, switching of the data traffic from one of said configurations to another of said configurations at each of two ends of said section;
    providing the OCH protection for at least one optical channel in the network, by transmitting data related to said optical channel from one of said network elements being a source point of said channel to another of said network elements being a destination point of said channel by means of two optical signals, wherein one of said optical signals is transmitted via the main configuration and another of said optical signals is transmitted via the protecting configuration;
    preliminarily applying a specific additional pilot tone for transmitting data from the source point of the OCH protected channel via a specific one of said configurations,
    selecting an optical signal in an OCH protected optical channel, in case of a fault in a section of said network, by relying on an indication associated with OMS switching functionality required to overcome said fault,
    wherein said step of selecting being performed by rejecting the one of the two optical signals of said OCH protected channel, that has undergone the switching from one of said configurations to another of said configurations owing to the OMS protection, the rejecting being based on detecting a discrepancy, from the point of presence of said specific pilot tone, between a received and an expected optical signal from one of said configurations at the destination point of said OCH protected channel, the discrepancy serving said indication,
    wherein the communication network consisting of no more than two ring-like configurations respectively formed by no more than two optical fibers connecting network elements, one of said configurations is considered a main configuration and the other is considered a protecting configuration, and
    wherein said specific optical signal in said OCH protected optical channel is selected between one signal transmitted via the main configuration and another signal transmitted via the protecting configuration.

2. The method according to claim 1, comprising:
    providing the OMS protection for at least one section of the network by ensuring, in case of a failure in said section, switching of the data traffic from one of said configurations to another of said configurations at each of two ends of said section;
    providing the OCH protection for at least one optical channel in the network, by transmitting data related to said optical channel from one of said network elements being a source point of said channel to another of said network elements being a destination point of said channel by means of two optical signals being said one signal and said another signal;
    said step of selecting being performed by rejecting the one of the two optical signals of said OCH protected channel, that has undergone said switching from one of said configurations to another of said configurations at least once, by relying on said indication being created in the optical signal while undergoing said switching.

3. The method according to claim 2, comprising providing switching means for the OMS protection and wherein the step of rejecting comprises detecting said indication in the optical signal having been switched by said switching means.

4. The method according to claim 3, wherein said indication is a momentary loss created in said signal while switching it in the switching means.

5. The method according to claim 3, wherein said indication is a signaling artifact added to the signal that has been switched in the switching means.

6. The method according to claim 5, wherein said signaling artifact is a modulating tone applied to the signal having been switched by said switching means.

7. The method according to claim 2, wherein the step of providing the OCH protection comprises providing an Optical Add Drop Multiplexer (OADM) at each of the source point and the destination point of the OCH protected channel, both in the main configuration and in the protecting configuration thereof.

8. The method according to claim 2, wherein the step of providing the OCH protection comprises arrangement thereof for a bi-directional optical channel, wherein each of the source point and the destination point serves as a source/destination point.

9. The method according to claim 8, wherein one and the same carrier wavelength is used for transmitting data along said bi-directional OCH protected optical channel.

10. A system capable of simultaneously performing Optical Multiplex Section (OMS) protection and Optical Channel (OCH) protection of optical traffic in a multi-channel multi-section optical communications ring-like network, the system being operative to select an optical signal in an OCH protected optical channel, in case of a fault in a section of said network, by relying on an indication associated with OMS switching functionality required to overcome said fault, said system comprising:

an OMS protection arrangement for at least one section of said network, including switching means at both ends of said section, an OCH protection arrangement for at least one optical channel formed in said network between a source point and a destination point of said channel, the OCH protection arrangement including Optical Add Drop Multiplexer (OADM) in a protecting configuration at the destination point of said optical channel, means for rejecting use of such an optical signal related to the OCH protected optical channel, that has been switched from one of said configurations to another at least once, by relaying on said indication, wherein said means for rejecting comprise a modulator at the source point of the OCH protected optical channel for preliminarily applying a specific pilot tone to data transmitted via said channel through a specific one of said configurations, and a tone detector at the destination point of said OCH protected optical channel for detecting said indication in the form of a discrepancy, from the point of presence of said specific pilot tone, between a received optical signal and an expected optical signal from one of said configurations at the destination point of said OCH protected optical channel, and for further rejecting the received optical signal in case the indication is detected, wherein said network consisting of no more than two ring-like configurations respectively formed by no more than two optical fibers connecting network elements, one of said configurations is considered a main configuration and the other is considered a protecting configuration, and wherein said specific optical signal in said OCH protected optical channel is selected between one signal transmitted via the main configuration and another signal transmitted via the protecting configuration.

11. The system according to claim 10, wherein, said means for rejecting use, at said destination point, of such an optical signal related to the OCH protected optical channel, relies on the indication being created in said optical signal while undergoing said switching.

12. The system according to claim 11, wherein said means for rejecting are situated at the destination point of said optical channel and comprise:

a detector of said indication associated with the switching of said optical signal in the switching means and a selector for selecting for further use an optical signal not comprising said indication.

13. The system according to claim 12, further comprising a generator of said indication, associated with the switching means.

14. The system according to claim 10, wherein said OCH protected optical channel is bi-directional.

15. The system according to claim 14, wherein one and the same carrier wavelength is used for transmitting data in said OCH protected optical channel in both said directions.

* * * * *